US007350852B2

(12) United States Patent
Rust et al.

(10) Patent No.: US 7,350,852 B2
(45) Date of Patent: Apr. 1, 2008

(54) INFLATABLE INTERIOR PANEL FOR A VEHICLE

(75) Inventors: John C Rust, Rochester Hills, MI (US); Risto C Trendov, Shelby Township, MI (US); Michael A Warnez, Ortonville, MI (US)

(73) Assignee: Chrysler LLC, Auburn Hills, MI (US)

( * ) Notice: Subject to any disclaimer, the term of this patent is extended or adjusted under 35 U.S.C. 154(b) by 137 days.

(21) Appl. No.: 11/220,339

(22) Filed: Sep. 6, 2005

(65) Prior Publication Data

US 2007/0052219 A1 Mar. 8, 2007

(51) Int. Cl.
*B60R 21/21* (2006.01)

(52) U.S. Cl. .......................... 296/187.06; 296/187.05; 296/146.7; 280/730.2; 280/751

(58) Field of Classification Search ............ 296/146.7, 296/187.05, 187.06; 280/748, 751, 753, 280/730.2, 730.1
See application file for complete search history.

(56) References Cited

U.S. PATENT DOCUMENTS

| | | | | | |
|---|---|---|---|---|---|
| 3,185,497 | A | * | 5/1965 | Lagace | 280/751 |
| 4,646,879 | A | * | 3/1987 | Mahler et al. | 180/90 |
| 5,141,279 | A | * | 8/1992 | Weller | 296/146.7 |
| 5,324,072 | A | * | 6/1994 | Olson et al. | 280/730.2 |
| 5,356,177 | A | * | 10/1994 | Weller | 280/751 |
| 5,382,051 | A | | 1/1995 | Glance | |
| 5,445,430 | A | * | 8/1995 | Nichols | 296/153 |
| 5,544,913 | A | * | 8/1996 | Yamanishi et al. | 280/730.2 |
| 5,615,914 | A | * | 4/1997 | Galbraith et al. | 280/743.1 |
| 5,716,093 | A | * | 2/1998 | Sadr | 296/146.6 |
| 5,816,645 | A | * | 10/1998 | Grimes | 296/153 |
| 5,868,421 | A | | 2/1999 | Eyrainer | |
| 5,899,522 | A | * | 5/1999 | DeRees et al. | 296/181.2 |
| 5,904,370 | A | * | 5/1999 | Steiner et al. | 280/743.1 |
| 5,921,610 | A | * | 7/1999 | Grimes | 296/153 |
| 5,967,594 | A | * | 10/1999 | Ramanujam | 296/153 |
| 6,032,978 | A | * | 3/2000 | Spencer et al. | 280/730.1 |
| 6,170,871 | B1 | | 1/2001 | Goestenkors et al. | |
| 6,203,057 | B1 | * | 3/2001 | Spencer et al. | 280/730.1 |
| 6,213,497 | B1 | * | 4/2001 | Spencer et al. | 280/730.1 |
| 6,578,867 | B2 | * | 6/2003 | Khoudari et al. | 280/730.1 |
| 6,592,358 | B2 | * | 7/2003 | Iwasaki | 425/525 |
| 6,612,611 | B1 | | 9/2003 | Swann et al. | |
| 6,619,689 | B2 | * | 9/2003 | Spencer et al. | 280/730.1 |
| 6,758,493 | B2 | * | 7/2004 | Conlee et al. | 280/753 |
| 2004/0212178 | A1 | | 10/2004 | Riesinger et al. | |
| 2005/0057024 | A1 | | 3/2005 | Weston et al. | |
| 2007/0052219 | A1 | | 3/2007 | Rust et al. | |

* cited by examiner

*Primary Examiner*—Dennis H. Pedder
*Assistant Examiner*—Mike Hernandez
(74) *Attorney, Agent, or Firm*—Ralph E. Smith

(57) ABSTRACT

An inflatable interior panel for a passenger vehicle includes a non-inflatable section, and an inflatable section having a peripheral portion adjacent the non-inflatable section. The inflatable section is isolated from the non-inflatable section wherein the inflatable section is not in fluid communication with the non-inflatable section. The inflatable section includes a base wall including a slack material section enabling inflation of the inflatable section, and an inboard wall connected to the base wall to define an interior of the inflatable section. When the interior is pressurized the inboard wall is moved away from the base wall to an extended position with respect to the relatively stationary non-inflatable section.

15 Claims, 4 Drawing Sheets

INFLATABLE INTERIOR PANEL FOR A VEHICLE

FIELD OF THE INVENTION

The present invention relates generally to interior safety devices for passenger vehicles and, more particularly, to an inflatable interior panel within a vehicle.

BACKGROUND OF THE INVENTION

Various safety devices are typically found in a passenger vehicle to provide protection to occupants of the vehicle. Such safety devices may include seat belts for restraining seated occupants, foam bolsters in doors, air bags in instrument panels and seats, air curtains in doors and headliners, and other like devices. Air bags and curtains are typically stored behind interior panels in an uninflated condition and, in certain vehicle impact events, the air bags displace the adjacent interior panel out of the way as they inflate to cushion a vehicle occupant.

However, such safety devices may not be suitable in all vehicle applications for use in protecting vehicle occupants. For example, current safety devices are assembled within or behind existing vehicle structure and, thus, are not integrated into existing vehicle interior structure, such as interior door panels. Also, present safety devices do not provide a means for isolating the movement of inflatable portions of an interior component, such as a door armrest, from adjacent portions of the interior component. Moreover, use of foam bolsters and air curtains often presents vehicle packaging difficulties and may not represent the most cost effective approaches to protecting occupants of a vehicle.

SUMMARY OF THE INVENTION

An inflatable interior panel for a passenger vehicle is provided which includes a non-inflatable section, and an inflatable section having a peripheral portion adjacent the non-inflatable section. The inflatable section is isolated from the non-inflatable section wherein the inflatable section is not in fluid communication with the non-inflatable section. The inflatable section includes a base wall including a slack material section enabling inflation of the inflatable section, and an inboard wall connected to the base wall to define an interior of the inflatable section. When the interior is pressurized the inboard wall is moved away from the base wall to an extended position with respect to the relatively stationary non-inflatable section.

In one exemplary embodiment, the inflatable interior panel is a unitary, blow-molded component including a non-inflatable armrest, and an inflatable hip and shoulder section that partially surrounds the non-inflatable armrest, and that has a peripheral portion adjacent a portion of the armrest. The inflatable hip and shoulder section includes a base wall including a slack material section enabling inflation of the inflatable section, and an inboard wall connected to the base wall to define an interior of the inflatable section. When the interior is pressurized the inboard wall is moved away from the base wall with respect to the relatively stationary non-inflatable armrest to an extended position. The inflatable hip and shoulder section also includes a shutoff section between the non-inflatable armrest and the inflatable section to prevent pressurization of the non-inflatable armrest. Finally, an inflator is provided in fluid communication with the interior of the inflatable hip and shoulder section to pressurize the interior and thereby inflate the inflatable hip and shoulder section.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF PREFERRED EMBODIMENTS

Figure 1:
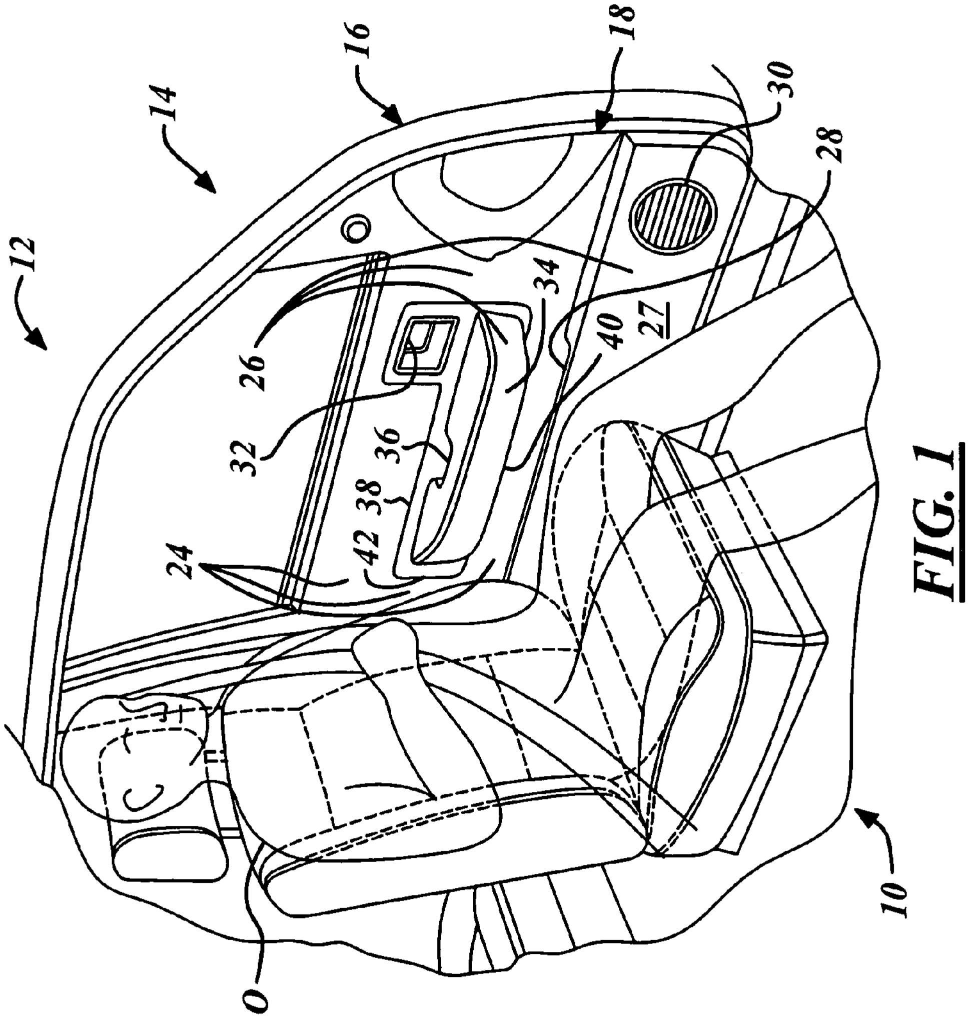
FIG. 1 is a partial perspective view of a passenger compartment of a passenger vehicle showing a door assembly including one embodiment of an inflatable door panel.
Figure 2:
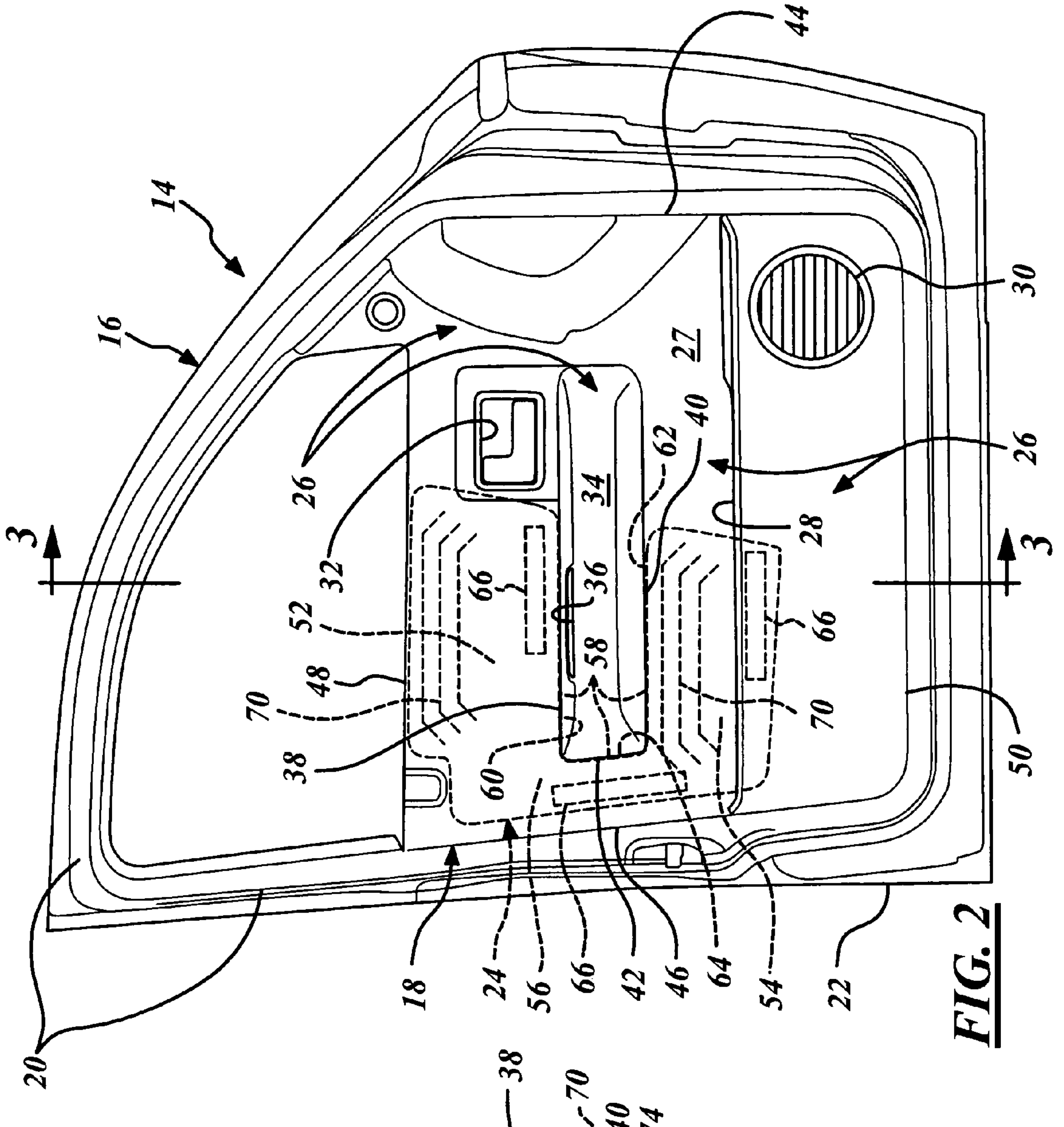
FIG. 2 is an elevational view of the door assembly of FIG. 1

Referring in more detail to the drawings, FIG. 1 illustrates a portion of a passenger compartment 10 of a passenger vehicle 12 having a door assembly 14 to permit ingress and egress of a vehicle passenger or occupant O, and to help cushion or dissipate the force of an occupant collision therewith during certain vehicle impact events according to a first exemplary embodiment of the present invention. The occupant O is seated proximate and inboard with respect to the door assembly 14 such that a left side of the occupant O is adjacent the door assembly 14. As also shown in FIG. 2, the door assembly 14 includes a door 16 and an inflatable, or at least partially inflatable, interior door panel 18 carried by the door 16. The door 16 may be any suitable automotive door such as a driver door, front passenger door, or rear passenger door. Also, the door 16 may have a door frame 20 with an exterior skin 22 attached thereto.

The inflatable interior door panel 18 includes an inflatable section 24 that inflates to protect the occupant O as will be described further herein below, and a non-inflatable section 26 that does not inflate when the inflatable section 24 is inflated. As will be demonstrated below, the non-inflatable section 26 is isolated from the inflatable section 24 so that the non-inflatable section 26 is not significantly displaced into the passenger compartment of the vehicle.

The non-inflatable section 26 may provide typical interior door panel features and functionality. For example, the non-inflatable section 26 may include a unitary base panel 27 that includes a map pocket 28, a speaker cover 30, a door latch opening 32, and the like. The non-inflatable section 26 may also include an armrest 34, which may or may not be part of the unitary base panel 27. The armrest 34 may include an integrated door handle 36, an upper edge 38, a lower edge 40, and a rearward edge 42 connecting the aforementioned upper and lower edges 38, 40. Those of ordinary skill in the art will recognize that the armrest 34 could also be a separate component or sub-assembly that mounts to the unitary base panel 27 and/or the door frame in any suitable fashion, including use of conventional methods and fasteners.

As best shown in FIG. 2, the unitary base panel 27 may also include a front edge 44, rear edge 46, top edge 48, and a bottom edge 50 that follow contours of corresponding edges or features of the door 16. The unitary base panel 27 may be constructed in any suitable fashion, including by injection molding, thermoforming, or in accordance with any other suitable conventional interior door panel manufacturing processes. Likewise, the unitary base panel 27 may be composed of any suitable materials, including conventional interior door panel materials, such as ABS, DC/ABS, or the like. The unitary base panel 27 may be attached to the door frame 20 in any suitable manner, including conventional attachment methods and devices. For example, those of ordinary skill in the art will recognize that the unitary base panel 27 may be attached to the door 16 by any one or more of clips, screws, rivets, adhesives, “Christmas tree” fasteners, 2-piece clip pin and grommet fasteners, or the like.

The inflatable section 24 of the door panel 18 provides a device to cushion or dissipate the force or an occupant collision with the door panel during certain vehicle impact events. The inflatable section 24 may be a hollow body that may be integral with or separate from the unitary base panel 27, constructed in any suitable manner including blow molding, and composed of any suitable materials, including conventional door panel materials. The inflatable section 24 may also be composed of polypropylene (PP), urethane, polycarbonate/acrylonitrile-butadiene-styrene (PC/ABS) such as Dow Pulse® resin, Lexan® resin, any blends of the aforementioned materials, or the like. The inflatable section 24 may be U-shaped, as shown, including an inflatable shoulder cushion 52, an inflatable hip cushion 54, and a tunnel portion 56 therebetween to maintain the shoulder and hip cushions 52, 54 in fluid communication. Accordingly, the inflatable section 24 includes a U-shaped central peripheral portion 58 adjacent the armrest 34 of the non-inflatable section 26 to follow the contours of the periphery of the armrest 34. More specifically, the inflatable section 24 includes a lower edge 60 of the shoulder cushion 52, an upper edge 62 of the hip cushion 54, and a forward edge 64 of the tunnel portion 56 connecting the aforementioned upper and lower edges 60, 62, wherein all of the edges 60, 62, 64 are adjacent corresponding lower, upper, and rearward edges 38, 40, 42 of the armrest 34.

As indicated in hidden lines, an inflator 66 may be provided in fluid communication with the inflatable section 24. While three locations for the inflator 66 are shown in FIG. 2, only one inflator 66 may be needed and it can be positioned in any desirable location including in one of the locations as shown. If desired, more than one inflator 66 may be used. The inflator 66 may be any suitable device for pressurizing the inflatable section 24, including conventional inflator devices used for airbags, air curtains, and the like. Moreover, the inflator 66 may be mounted to the door assembly 14 in any suitable manner including attachment to the inflatable section 24.

Figure 3:
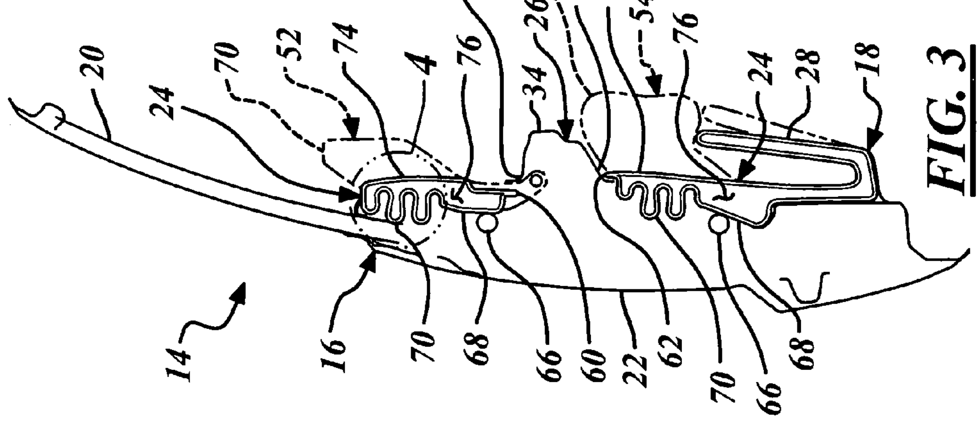
FIG. 3 is a cross-sectional view of the door assembly of FIG. 1, taken along line 3-3 of FIG. 2.

FIG. 3 shows in phantom lines portions of the inflatable section 24 of the door panel 18 in an inflated state. The inflatable section 24 includes an outboard wall, or base wall 68, that may be mounted to the door 16. In an implementation where the inflatable section 24 is a separate component, it may be mounted to the unitary base panel 27 of the door panel 18.

Figure 4:
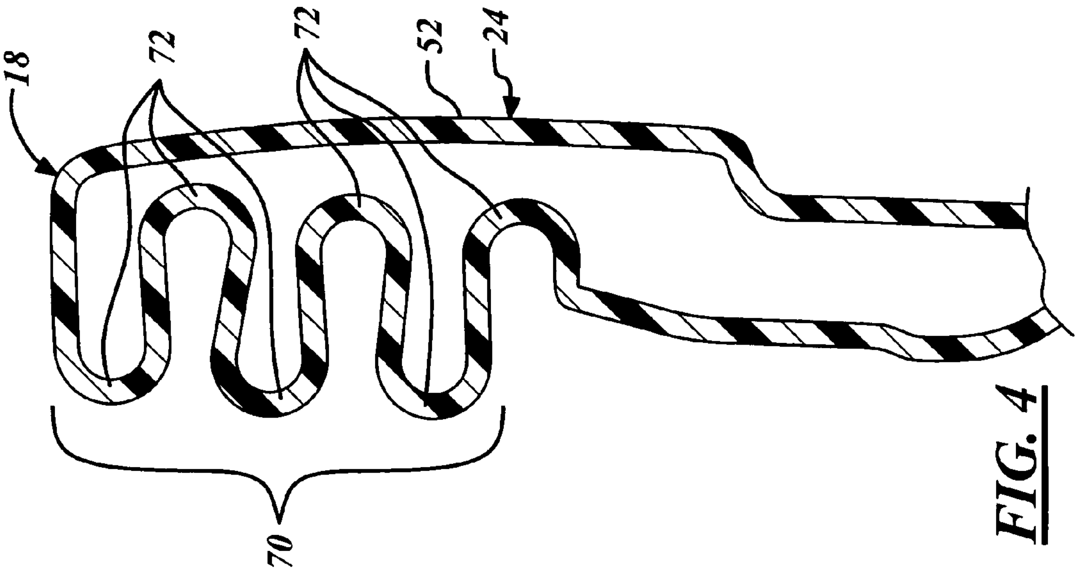
FIG. 4 is an enlarged fragmentary cross-sectional view of the encircled portion 4 in FIG. 3.

The base wall 68 associated with the shoulder cushion portion 52 and with the hip cushion 54 portion includes slack material sections 70 disposed at outer or free regions of the inflatable section 24 that enable inflation of those portions of the inflatable section 24. Preferably, the slack material sections 70 of the base wall 68 are not fastened to the door 16 so that the slack material sections 70 are unrestrained and free to unfold and permit displacement of expansion of the shoulder and hip cushions 52, 54 when pressurized fluid is admitted into the inflatable section 24. Other portions of the base wall 68, however, may be suitably fastened to the door 16. As an example, FIG. 4 illustrates an enlarged portion of the door panel 18 focusing on one of the slack material sections 70 in solid lines and in a folded state. The slack material section 70 may be constructed to include a plurality of folds, corrugations, or pleats 72 that may be of any suitable size, quantity, and orientation. Alternatively, the slack material section 70 may simply be comprised of loose, extra material that is not fastened down to the door, or any other material configuration that will allow the inflatable section 24 to be displaced toward the vehicle occupant.

Referring to FIG. 3, the inflatable section 24 also includes an inboard wall 74 that is connected to the base wall 68 to define an interior 76 of the inflatable section 24. Accordingly, at least portions of the inboard wall 74 are moved outwardly away from the base wall 68 with respect to the relatively stationary non-inflatable section 26, including the armrest 34, to an extended position by pressurization of the interior 76 when the inflator 66 is activated.

The inflator 66 may be activated during certain vehicle impact events as determined by any suitable safety sensing system (not shown) of the vehicle, as will be recognized by those of ordinary skill in the art. The sensing system may be local or remote to the inflatable section 24 and may include an accelerometer coupled to a control module to provide an activation signal to the inflator 66. When activated, the inflator 66, the inflator 66 releases stored compressed fluid to cause an increase in pressure within the interior 76 of the inflatable section 24, thereby expanding the inflatable section 24 such that the slack material section 70 of the base wall 68 unfolds and, thus, the movable inboard wall 74 is displaced. As shown in phantom lines in FIG. 3, the slack material section 70 unfolds in an inboard direction away from the door 16 and base panel 68, such that the pleated section 70 and wall 74 project into the passenger compartment. Accordingly, the non-inflatable section 26, including the armrest 34, is basically isolated from the inflation and movement of the inflatable section 24 so that the non-inflatable section 26, and particularly the armrest 34, is not significantly displaced into the passenger compartment of the vehicle to reduce the likelihood that the armrest 34 will be struck by the occupant, or to reduce the force of engagement of the occupant with the armrest.

Figure 5:
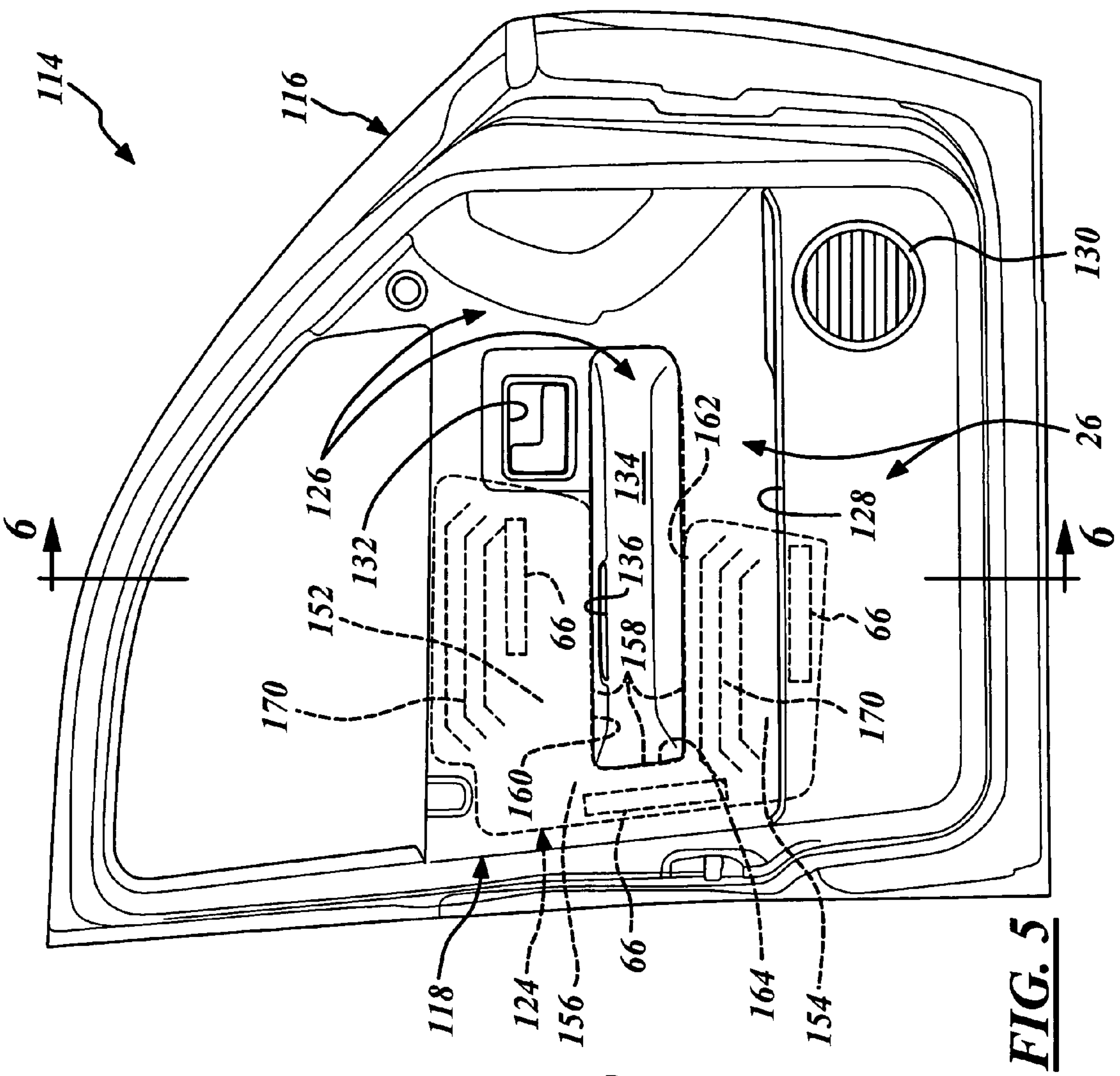
FIG. 5 is an elevational view of another door assembly including another embodiment of an inflatable door panel.
Figure 6:
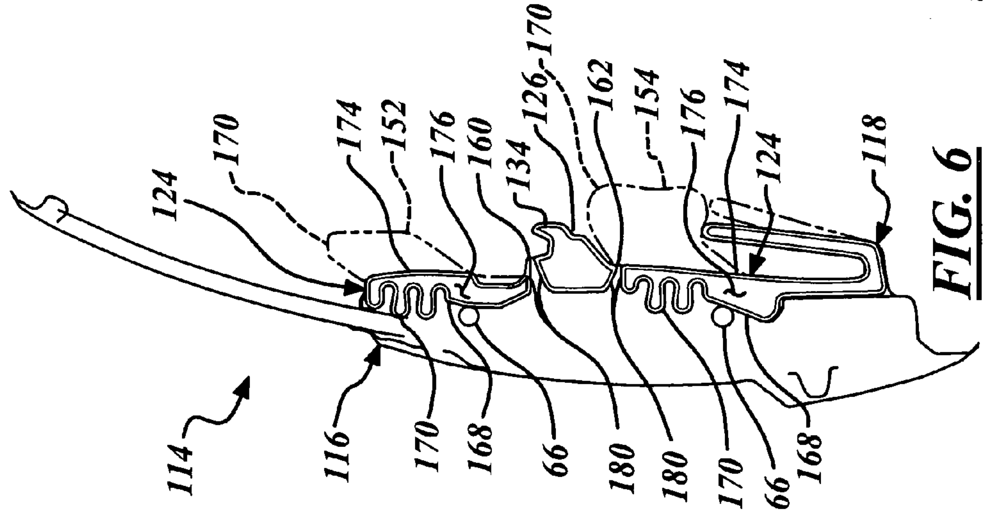
FIG. 6 is a cross-sectional view of the door assembly of FIG. 5, taken along line 6-6 of FIG. 5.

FIGS. 5 and 6 illustrate a second exemplary embodiment of an inflatable interior door panel 118 attached to a door 116 that is part of a door assembly 114. This exemplary embodiment is similar in many respects to the embodiment of FIGS. 1 through 4 and like numerals between the embodiments generally designate like or corresponding elements throughout the several views of the drawing figures. Additionally, the description of the previous exemplary embodiment is incorporated herein and the common subject matter may generally not be repeated here.

Unlike the inflatable interior door panel 18 of FIGS. 1 through 4, the inflatable door panel 118 of this embodiment is preferably a substantially unitary component that is blow molded from any suitable polymeric material, including those mentioned previously. However, like the previous embodiment, the inflatable interior door panel 118 includes a hollow body or inflatable section 124 that inflates as will be described further herein below, and a non-inflatable section 126 that does not inflate when the inflatable section is inflated. The non-inflatable section 126 may be wholly or partially hollow or may include solid portions. Like the previous embodiment, the non-inflatable section 126 is isolated from at least some portions of the inflatable section so that the non-inflatable section 126 is not displaced into the passenger compartment of the vehicle so as to impact the occupant.

The non-inflatable section 126 may provide typical interior door panel features such as a map pocket 128, a speaker cover 130, a door latch opening 132, an armrest 134, and the like. As with the previous embodiment, the armrest 134 may include an integrated door handle 136. But whereas the armrest 34 of the previous embodiment was a separate component from the inflatable section 24, the armrest 134 of this embodiment is integral with, but fluidically isolated from, the inflatable section 124.

FIG. 6 illustrates the door panel 118 wherein portions of the inflatable section 124 are shown in an uninflated state in solid lines and in an inflated state in phantom lines. The inflatable section 124 includes an outboard or base wall 168 that may be mounted to the door 116. The inflatable section 124 also includes an inboard wall 174 that is connected to the base wall 168 to define an interior 176 of the inflatable section 124.

To isolate the inflatable section 124 from the armrest 134 of the non-inflatable section 126, shutoff sections or shutoffs 180 are provided therebetween. The shutoffs 180 may be created during the blow molding manufacturing process of the door panel 118 wherein portions of the base wall 168 and the inboard wall 174 are pinched together in selective locations of the door panel 118. For example, the walls may be pinched together along a peripheral portion 158 adjacent the armrest 134 of the non-inflatable section 126 to follow the contour of the outer periphery of the armrest 134. More specifically, the walls may be pinched together to define the central inner U-shape of the inflatable section 124 to include a lower edge 160 of a shoulder cushion 152, an upper edge 162 of a hip cushion 154, and a forward edge 164 of a tunnel portion 156 connecting the aforementioned lower and upper edges 160, 162, wherein all of the edges 160, 162, 164 are adjacent corresponding edges of the outer periphery of the armrest 134. Those of ordinary skill in the art will recognize that other portions of the walls of the inflatable section 124 may also be selectively pinched together to further isolate the inflatable section 124 from other parts of the non-inflatable section 126, such as the map pocket 128, or the like.

The base wall 168 at the inflatable shoulder cushion portion 152 and at the inflatable hip cushion portion 154 includes corresponding slack material sections 170 that enable inflation of those portions of the inflatable section. The slack material section 170 is shown in solid lines in a folded state. The inflator 66 releases stored compressed fluid to cause an increase in pressure within the interior 176 of the inflatable section 124, thereby expanding the inflatable section 124 such that the slack material section 170 of the base wall 168 unfolds and, thus, the movable inboard wall 174 is displaced. As shown in phantom lines in FIG. 6, the slack material section 170 unfolds away from the door 116 and into the passenger compartment. However, the armrest 134 remains relatively stationary primarily because the interior thereof is not communicated with the interior 176 of the pressurized inflatable section and, thus, the armrest interior is not pressurized. Moreover, the armrest 134 may also be fastened directly to the door 116 to further prevent movement during inflation of the inflatable door panel 118. Accordingly, the inboard wall 174 of the inflatable section 124 is projectable to an extended position away from the base wall 168, with respect to the relatively stationary armrest 134 of the non-inflatable section 126, by pressurization of the interior 176 when the inflator 66 is activated. The non-inflatable section 126 is basically isolated from the inflation and movement of the inflatable section 124 so that the non-inflatable section 126, particularly the armrest 134, is not displaced into the passenger compartment of the vehicle.

Figure 7:
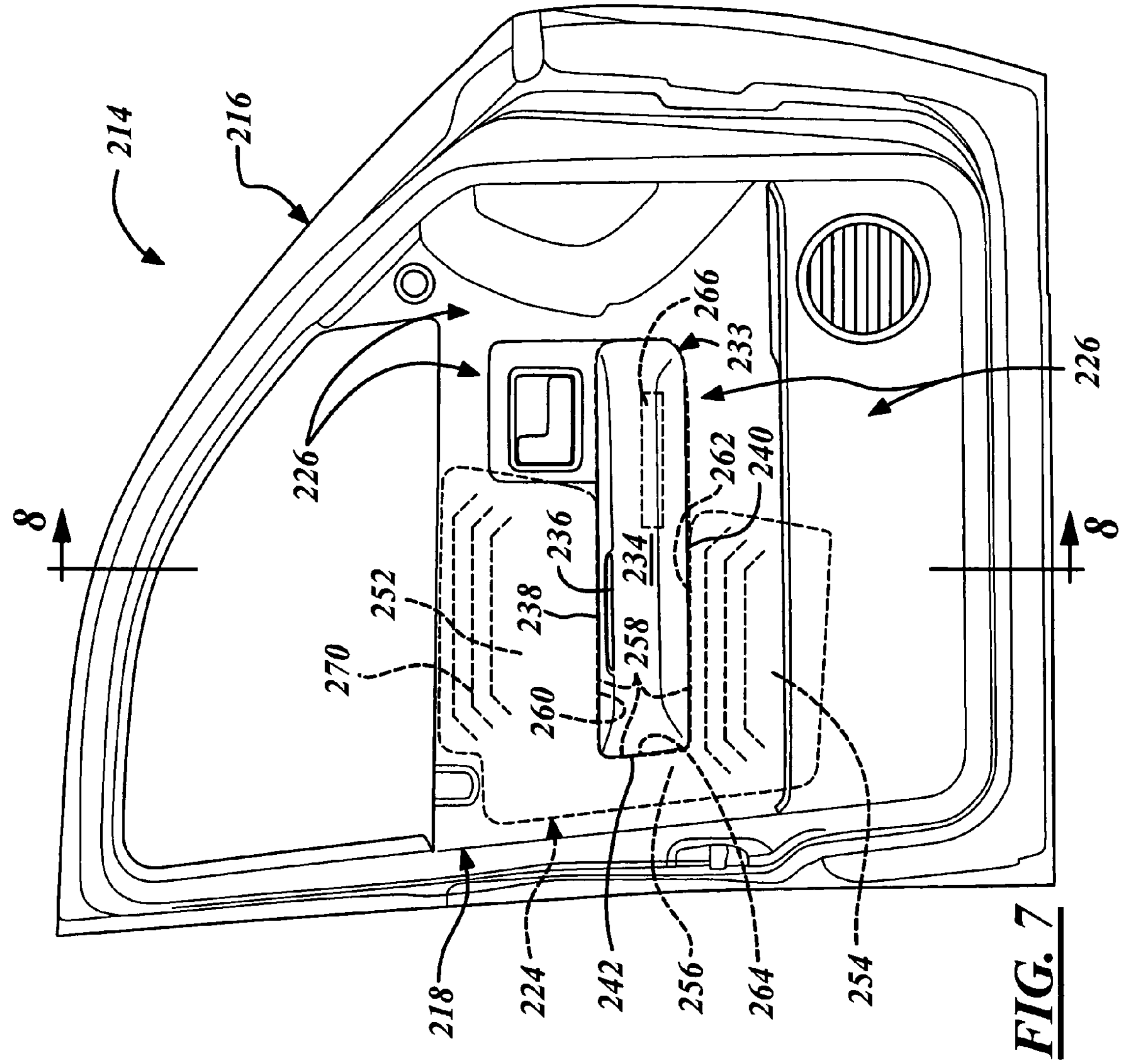
FIG. 7 is an elevational view of an additional door assembly including an additional embodiment of an inflatable door panel.
Figure 8:
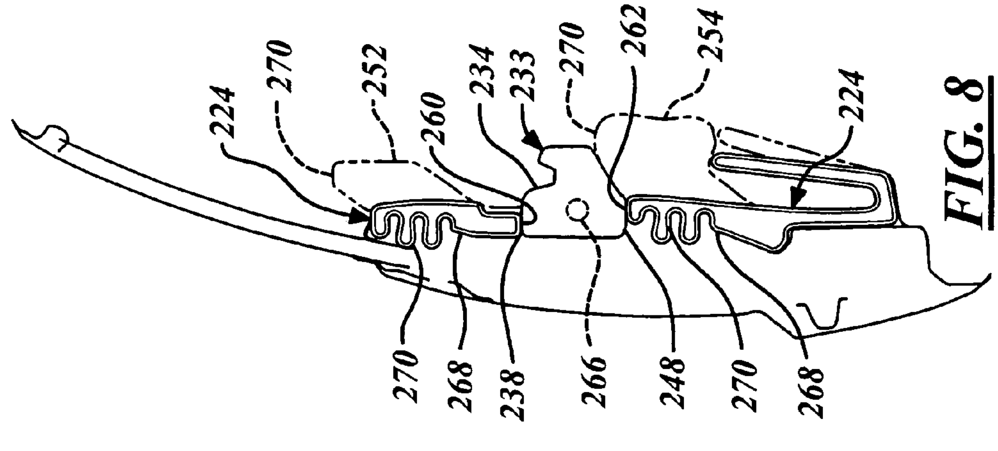
FIG. 8 is a cross-sectional view of the door assembly of FIG. 7, taken along line 8-8 of FIG. 7.

FIGS. 7 and 8 illustrate a third exemplary embodiment of an inflatable interior door panel 218 attached to a door 216 that is part of a door assembly 214. This embodiment is similar in many respects to the embodiments of FIGS. 1 through 6 and like numerals between the embodiments generally designate like or corresponding elements throughout the several views of the drawing figures. Additionally, the description of the previous embodiments are incorporated herein and the common subject matter may generally not be repeated here.

Like the inflatable interior door panel 118 of FIGS. 5 and 6, the inflatable door panel 218 of this embodiment is preferably a substantially unitary blow molded component, except that the door panel 218 also includes a non-inflatable individual armrest assembly 233 attached to the door 216 and/or an underlying unitary blow molded base panel of the door panel 218. Therefore, like the previous embodiments, the inflatable interior door panel 218 includes an inflatable section 224 or hollow body that inflates as will be described further herein below, and a non-inflatable section 226, including the armrest assembly 233, that does not inflate when the inflatable section 224 is inflated. In other words, the non-inflatable section 226 is isolated from at least some portions of the inflatable section 224 so that the non-inflatable section 226 is not displaced into the passenger compartment of the vehicle.

The armrest assembly 233 is preferably separately manufactured from the rest of the non-inflatable section 226 of the door panel 218 and includes an armrest 234 and an inflator 266 carried by the armrest 234. The armrest 234 may be constructed in any suitable manner such as injection molding and may be composed of any suitable materials. The armrest 234 may be attached to an outboard surface of an underlying base panel of the non-inflatable section 226 of the door panel 218, or may be attached directly to the door 216. Attachment of the armrest 234 to the door 216 may be facilitated by providing an armrest-shaped aperture (not shown) through the non-inflatable section 226 of the underlying the armrest 234, or by providing bolt-hole shutoffs (not shown) through the non-inflatable section 226 of the underlying the armrest 234. As with the previous embodiment, the armrest 234 may include an integrated door handle 236. But whereas the armrest 234 of the previous embodiment is integral with the non-inflatable section 226, the armrest 234 of this embodiment is entirely separate and isolated with respect to the inflatable section 226. The inflator 266 may be carried in any suitable fashion by the armrest 234 and is communicated to an interior 276 of the inflatable section 224 in any suitable manner including use of conduit, hose clamps, and the like (not shown).

FIG. 8 illustrates the door panel 218 wherein portions of the inflatable section 224 are shown in an uninflated state in solid lines and in an inflated state in phantom lines. The U-shaped inflatable section 224 includes an outboard or base wall 268 that may be mounted to the door 216. The inflatable section 224 also includes an inboard wall 274 that is connected to the base wall 268 to define the interior 276 of the inflatable section 224. The walls may be closed along a peripheral portion 258 adjacent the armrest 234 of the non-inflatable section 226 to follow the contour the outer periphery of the armrest 234. More specifically, the walls may be closed together to define the central inner U-shape of the inflatable section 224 to include a lower edge 260 of a shoulder cushion 252, an upper edge 262 of a hip cushion 254, and a forward edge 264 of a tunnel portion 256 connecting the aforementioned lower and upper edges 260, 262, wherein all of the edges 260, 262, 264 are adjacent corresponding edges 238, 240, 242 of the outer periphery of the armrest 234.

The base wall 268 at an inflatable shoulder cushion portion 252 and at an inflatable hip cushion portion 254 includes pleated sections 270 that enable inflation of those portions of the inflatable section 224. The pleated sections 270 are shown in solid lines in a folded state and in phantom lines in an unfolded state. The inflator 266 releases stored compressed fluid to cause a sudden increase in pressure within the interior 276 of the inflatable section 224, thereby expanding the inflatable section 224 such that the slack material section 270 of the base wall 268 unfolds and, thus, the movable inboard wall 274 is displaced. As shown in phantom lines in FIG. 6, the slack material section 270 unfolds away from the door 216 and into the passenger compartment. However, the armrest 234 remains relatively stationary because the armrest 234 is preferably attached to the door 216 and because the interior of the armrest is entirely separated from the interior of the pressurized inflatable section 224 and, thus, the armrest interior is not pressurized. Accordingly, the inboard wall 274 of the inflatable section 224 is projectable to an extended position away from the base wall 268 with respect to the relatively stationary armrest 234 of the non-inflatable section 226 by pressurization of the interior 276 when the inflator 266 is activated. The non-inflatable section 226 is basically isolated from the inflation and movement of the inflatable section 224 so that the non-inflatable section 226, particularly the separate armrest 234, is not displaced into the passenger compartment of the vehicle.

In one or more of the above-described embodiments, there is provided an inflatable door panel that may provide certain advantages. For example, the inflatable door panel is readily integrated into existing vehicle components and, thus, packages easily into a vehicle. Also, the inflatable door panel is of relatively simple design and economical to manufacture and assemble. Moreover, the inflatable door panel is easily integrated into a door to accommodate many different interior door panel designs.

While certain exemplary embodiments have been shown and described, persons of ordinary skill in this art will readily recognize that the preceding description has been set forth in terms of description rather than limitation, and that various modifications and substitutions can be made without departing from the spirit and scope of the invention. By way of example without limitation, while the inflatable door panel has been disclosed as a door panel, the invention could be otherwise incorporated in other vehicle interior components or assemblies, for example headliners, B-pillars, and the like. Of course, still other modifications and substitutions can be made. The invention is defined by the following claims.

What is claimed is:

1. An inflatable interior panel for a passenger vehicle, comprising:

a non-inflatable section; and an inflatable section partially surrounding the non-inflatable section and fluidically isolated therefrom wherein the non-inflatable section and the inflatable section are part of a single blow-molded component including a shutoff section between the non-inflatable section and the inflatable section to prevent pressurization of the non-inflatable section, the inflatable section having a U-shaped central peripheral portion adjacent the non-Inflatable section, including:

a base wall including a slack material section enabling inflation of the inflatable section; and an inboard wall connected to the base wall to define an Interior of the inflatable section, such that when the interior is pressurized the inboard wall is moved away from the base wall to an extended position with respect to the non-inflatable section, and the non-inflatable section is not significantly displaced into the passenger compartment of the vehicle so as to impact an occupant.

2. The inflatable interior panel of claim 1, wherein the shutoff section includes portions of the base wall and the inboard wall being pinched together substantially along the peripheral portion of the inflatable section.

3. The inflatable interior panel of claim 1, further comprising an inflator in fluid communication with the Interior of the inflatable section.

4. The Inflatable interior panel of claim 3, wherein the Inflatable section includes at least one of a shoulder portion, a hip portion, or a tunnel portion therebetween, and the inflator Is carried by one of the shoulder, hip, or tunnel portions.

5. The inflatable interior panel of claim 1, wherein the non-Inflatable section and the inflatable section are Individual components separate from one another.

6. The inflatable interior panel of claim 5, wherein the non-inflatable section is part of an injection molded body and the inflatable section includes a blow molded body.

7. The inflatable interior panel of claim 5, wherein the inflatable section is part of a blow molded panel.

8. The inflatable interior panel of claim 7, further comprising an inflator in fluid communication with the interior of the inflatable section and carried by the non-inflatable section.

9. An inflatable interior door panel of a passenger vehicle, comprising:

a non-inflatable armrest; and an inflatable section partially surrounding the non-inflatable armrest and fluidically isolated therefrom wherein the non-inflatable and the inflatable section are Dart of a single blow-molded component including a shutoff section between the non-inflatable armrest and the inflatable section to prevent pressurization of the non-Inflatable armrest, the inflatable section being arranged for contact with an occupant of the vehicle and having a U-shaped central peripheral portion adjacent the non-inflatable armrest, including:

a base wall including a slack material section enabling inflation of the inflatable section; and an inboard wall connected to the base wall to define an interior of the inflatable section, such that when the interior is pressurized the inboard wall is moved away from the base wall to an extended position with respect to the non-inflatable armrest, and the non-inflatable armrest is not significantly displaced Into the passenger compartment of the vehicle so as to impact an occupant.

10. The inflatable interior panel of claim 9, wherein the shutoff section Includes portions of the base wall and the inboard wall being pinched together substantially along the peripheral portion of the inflatable section.

11. The inflatable interior door panel of claim 9, wherein the non-inflatable armrest and the inflatable section are individual components separate from one another.

12. The inflatable interior door panel of claim 11, wherein the non-inflatable armrest is part of an injection molded body and the inflatable section includes a blow molded body.

13. The inflatable interior door panel of claim 11, wherein the inflatable section is part of a blow molded panel.

14. The inflatable interior door panel of claim 13, further comprising an inflator in fluid communication with the interior of the inflatable section and carried by the non-inflatable armrest.

15. A unitary, blow-molded, inflatable interior door panel for a passenger vehicle, comprising:

a non-Inflatable armrest;

an inflatable hip and shoulder section fluidically isolated from the non-inflatable armrest, the inflatable hip and shoulder section at least partially surrounding the non-inflatable armrest and having a U-shaped central peripheral portion adjacent at least a portion of the armrest, including:

a base wall including a slack material section enabling inflation of the inflatable section; and an inboard wall connected to the base wall to define an interior of the inflatable section, such that when the interior is pressurized the inboard wall is moved away from the base wall to an extended position with respect to the non-inflatable armrest, and the non-inflatable armrest is not significantly displaced into the passenger compartment of the vehicle so as to impact an occupant;

a shutoff section between the non-inflatable armrest and the Inflatable section to prevent pressurization of the non-inflatable armrest wherein the shutoff section includes portions of the base wall and the inboard wall being pinched together substantially along the peripheral portion of the inflatable hip and shoulder section; and an inflator in fluid communication with the interior of the inflatable hip and shoulder section to pressurize the interior and thereby inflate the inflatable hip and shoulder section.

* * * * *